Patented June 1, 1954

2,680,136

UNITED STATES PATENT OFFICE 2,680,136

PREPARATION OF MONOCYCLIC AMINO-ARYL LOWER ALKYL CARBINOLS

John Lomartire, Summit, N. J., assignor to Celanese Corporation of America, New York, N. Y., a corporation of Delaware No Drawing. Application May 7, 1952, Serial No. 286,615

12 Claims. (Cl. 260—575)

This invention relates to a process for catalytic hydrogenation and more particularly to a process for the catalytic hydrogenation of a monocyclic nitroaryl lower alkyl ketone to an aminoaryl alkyl carbinol.

It is an object of this invention to provide an efficient and practical process for the hydrogenation of monocyclic nitroaryl lower alkyl ketones so as to obtain monocyclic aminoaryl lower alkyl carbinols.

It is a further object of this invention to provide a catalytic method whereby monocyclic nitroaryl lower alkyl ketones may be hydrogenated to obtain excellent yields of monocyclic aminoaryl lower alkyl carbinols.

Still another object of this invention is the provision of a novel process for the efficient hydrogenation of m-nitro acetophenone to m-amino phenyl methyl carbinol.

Other objects of this invention will appear from the following detailed description.

I have now found that monocyclic nitroaryl lower alkyl ketones may be hydrogenated to monocyclic aminoaryl lower alkyl carbinols by a two-stage catalytic reaction. The hydrogenation process of my invention involves a first treatment with a controlled amount of hydrogen gas in the presence of a metal hydrogenation catalyst, the metal of which is in group VIII of the periodic table, followed by removal of the metal catalyst from the resulting products of hydrogenation and a second treatment with hydrogen gas at a pressure of at least about 1000 pounds per square inch gauge in the presence of a copper chromite hydrogenation catalyst.

In the first step the monocyclic nitroaryl lower alkyl ketone is reacted with about 3 mols of hydrogen gas under pressure per mol of the ketone in the presence of the metal hydrogenation catalyst, such as Raney nickel, Raney cobalt, palladium or platinum. Optimum results are obtained by the use of Raney nickel. It is essential that not more than about 3 mols of hydrogen be used per mol of ketone, since if excess hydrogen is used various side reactions occur. The pressure of the hydrogen gas is not critical, so long as it is above atmospheric pressure. The temperature of this first hydrogenation step should be in the range of 20–100° C. Optimum results, involving a desirable rate of reaction with practically no side reactions, are obtained at 30–50° C.

If desired, the first hydrogenation step can be conducted in several stages. For example, the ketone and the metal catalyst may be placed in an autoclave and subjected to 1½ mols of hydrogen gas per mol of ketone under pressure until the hydrogen gas is substantially all absorbed, and then subjected to another 1½ mols of hydrogen gas under pressure until substantially all of the second charge of hydrogen gas is absorbed.

After this first hydrogenation step the metal hydrogenation catalyst may be removed from the products of hydrogenation in any desired manner; for example, by filtration.

Following the removal of the metal hydrogenation catalyst the products of the first hydrogenation step are subjected to a second hydrogenation step, which takes place at a pressure of about 1000 to 10,000 pounds per square inch gauge, preferably about 4000 to 5000 pounds per square inch gauge, and at a temperature of 50 to 250° C., preferably 100 to 160° C., in the presence of a copper chromite hydrogenation catalyst.

The amounts of the catalyst used in each step are not critical. For practical purposes the proportions of the metal hydrogenation catalyst employed may range from about 2 to 50% by weight of the starting monocyclic nitroaryl lower alkyl ketone and the amount of copper chromite hydrogenation catalyst may range from about 2 to 50% by weight of the starting monocyclic nitroaryl lower alkyl ketone.

Any monocyclic nitroaryl lower alkyl ketone may be hydrogenated according to my new process. The simplest monocyclic nitroaryl lower alkyl ketone is nitroacetophenone, which may be hydrogenated to aminophenyl methyl carbinol. More complex monocyclic nitroaryl lower alkyl ketones may be employed. For example, the ketone may carry alkyl substituents, such as methyl, ethyl, propyl, butyl or amyl. Thus, the ketone may be o-nitrotolyl acetophenone or p-nitro o-ethyl phenyl butyrophenone, in which case the final hydrogenation products are o-aminotolyl methyl carbinol and p-amino o-ethyl phenyl propyl carbinol, respectively. The lower alkyl constituent of the ketone may be any lower alkyl group, such as a methyl, ethyl, propyl, or butyl group, as in m-nitrophenyl butyl ketone, which, on hydrogenation yields m-aminophenyl butyl carbinol. The novel hydrogenation process of my invention is particularly desirable with m-nitro compounds.

When my process is employed for the hydrogenation of a normally solid monocyclic nitroaryl lower alkyl ketone it is generally desirable to use a solvent in the reactions; for example, ethyl alcohol, tetrahydrofuran, dioxane, methyl cyclohexane, methylol, or ether. This solvent should be substantially inert to the hydrogenation steps. The solid ketone may be placed into the hydrogenation vessel and the solvent and catalyst then added, after which the mixture is subjected to hydrogen gas. If desired, the ketone may be dissolved in the solvent and the resulting solution added to the catalyst in the hydrogenation vessel prior to the introduction of hydrogen gas. The preferred solvent is tetrahydrofuran since its use permits a relatively high concentration of the solid ketone to be hydrogenated.

In order further to illustrate my invention, but without being limited thereto, the following examples are given:

*Example I*

The following charge was put into a stainless steel bomb:

41 parts by weight of m-nitro acetophenone.
407 parts by weight of denatured ethyl alcohol (Formula 30).
28 parts by weight of wet Raney nickel catalyst, which was made up of 21 parts by weight of nickel and 7 parts by weight of denatured ethyl alcohol.

This charge filled about 28% of the volume of the bomb. Hydrogen was fed into the bomb until the pressure therein was 288 pounds per square inch gauge, the hydrogen feed shut off, and the bomb agitated. Hydrogen absorption began at once and continued until 3 mols of hydrogen were absorbed per mol of m-nitroacetophenone, during which time the temperature of the charge rose from 24° C. to 37° C. and the pressure dropped to 67 pounds per square inch gauge.

At this point the bomb was vented and emptied. The charge was filtered free of nickel and returned to the bomb, where 20 parts by weight of copper chromite hydrogenation catalyst was added. The charge was then hydrogenated in the bomb at a temperature of 150–155° C. and under a pressure of hydrogen gas of 4700–4800 pounds per square inch gauge for five minutes and then cooled. During this second hydrogenation step 1.5 mols of hydrogen were absorbed per mol of m-nitroacetophenone in the original charge.

The cooled reaction mixture was filtered, and about 95% of the solvent was removed by distillation at atmospheric pressure. The m-amino phenyl methyl carbinol then crystallized. 34 parts by weights of m-amino phenyl methyl carbinol were isolated.

*Example II*

The following charge was put into a stainless steel autoclave filled with a stirrer.

650 parts by weight of m-nitro acetophenone.
1776 parts by weight of tetrahydrofuran.
50 parts by weight of wet Raney nickel catalyst, which was made up of 75% by weight of nickel and 25% by weight of tetrahydrofuran.

This charge, having a temperature of 22° C., filled about 45% of the volume of the autoclave. The charge was stirred continuously during the reaction. Hydrogen gas was fed into the autoclave until the pressure therein was 1700 pounds per square inch gauge. The hydrogen feed was shut off and hydrogen absorption took place gradually. After about 4½ hours the temperature had risen to 38° C. and the pressure had fallen to 1310 pounds per square inch gauge. After about 22 hours the temperature had dropped to 20° C. and the pressure had fallen to 400 pounds per square inch gauge. External heat was then applied to raise the temperature of the charge to 45° C. after which further absorption of hydrogen took place until the pressure dropped to atmospheric pressure, following which the autoclave was vented and emptied. The total amount of hydrogen absorbed was 3 mols per mol of m-nitroacetophenone. The charge was then filtered free of nickel and mixed with 155 parts by weight of copper chromite hydrogenation catalyst. The resulting reaction mixture was placed in a stainless steel rocking bomb whose volume was about 2 times that of the charge. Hydrogen was fed into the bomb until the pressure was 3500 lbs. per square inch, the hydrogen feed was shut off and the bomb was agitated and heated until the temperature rose to 126° C. and the pressure rose to 4700 pounds per square inch. External heating was then discontinued. Absorption of hydrogen gas began, and the pressure dropped over a period of about 15 minutes to 3900 pounds per square inch gauge while the temperature rose to 148° C. The bomb was then cooled to room temperature and vented. The reaction product was filtered and about 95% of the solvent was removed by distillation at atmospheric pressure. The m-amino phenyl methyl carbinol then crystallized. 526 parts by weight of m-amino phenyl methyl carbinol were obtained.

It is to be understood that the foregoing detailed description is given merely by way of illustration and that many variations may be made therein without departing from the spirit of my invention.

Having described my invention, what I desire to secure by Letters Patent is:

1. Process for the production of a monocyclic aminoaryl lower alkyl carbinol, which comprises reacting 1 mol of a monocyclic nitroaryl lower alkyl ketone with hydrogen gas under pressure in the presence of a metal hydrogenation catalyst the metal of which is in group VIII of the periodic table and at a temperature of 20° C. to 100° C., removing the metal hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

2. Process for the production of a monocyclic aminoaryl lower alkyl carbinol, which comprises reacting 1 mol of a monocyclic mono-nitroaryl lower alkyl ketone with about 3 mols of hydrogen gas under pressure in the presence of a metal hydrogenation catalyst the metal of which is in group VIII of the periodic table and at a temperature of 20° C. to 100° C., removing the metal hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

3. Process for the production of a monocyclic aminoaryl lower alkyl carbinol, which comprises reacting 1 mol of a monocyclic mono-nitroaryl lower alkyl ketone with about 3 mols of hydrogen gas under pressure in the presence of Raney nickel hydrogenation catalyst and at a temperature of 20° C. to 100° C., removing Raney nickel hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

4. Process for the production of a monocyclic aminoaryl lower alkyl carbinol, which comprises reacting 1 mol of a monocyclic mononitroaryl lower alkyl ketone with about 3 mols of hydrogen gas under pressure in the presence of a metal hydrogenation catalyst the metal of which is in group VIII of the periodic table and a solvent for the ketone and at a temperature of 20° C. to 100° C., removing the metal hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

5. Process for the production of a monocyclic aminoaryl lower alkyl carbinol, which comprises reacting 1 mol of a monocyclic mono-nitroaryl lower alkyl ketone with about 3 mols of hydrogen gas under pressure in the presence of Raney nickel hydrogenation catalyst and a solvent for the ketone and at a temperature of 20° C. to 100° C., removing Raney nickel hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

6. Process for the production of m-amino phenyl methyl carbinol which comprises reacting 1 mol of m-nitro acetophenone with about 3 mols of hydrogen gas under pressure in the presence of Raney nickel hydrogenation catalyst and a solvent for the m-nitroacetophenone and at a temperature of 20° C. to 100° C., removing the Raney nickel hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

7. Process for the production of m-amino phenyl methyl carbinol which comprises reacting 1 mol of m-nitro acetophenone with about 3 mols of hydrogen gas under pressure in the presence of Raney nickel hydrogenation catalyst and ethyl alcohol and at a temperature of 20° C. to 100° C., removing the Raney nickel hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

8. Process for the production of m-amino phenyl methyl carbinol which comprises reacting 1 mol of m-nitro acetophenone with about 3 mols of hydrogen gas under pressure in the presence of Raney nickel hydrogenation catalyst and tetrahydrofuran and at a temperature of 20° C. to 100° C., removing the Raney nickel hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

9. Process for the production of a monocyclic aminoaryl lower alkyl carbinol, which comprises reacting 1 mol of a monocyclic mono-nitroaryl lower alkyl ketone with about 3 mols of hydrogen gas under pressure in the presence of Raney nickel hydrogenation catalyst and tetrahydrofuran and at a temperature of 20° C. to 100° C., removing Raney nickel hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

10. Process for the production of m-amino phenyl methyl carbinol, which comprises reacting 1 mol of m-nitro acetophenone with about 3 mols of hydrogen gas under pressure in the presence of Raney nickel hydrogenation catalyst and ethyl alcohol and at a temperature of 20° C. to 100° C., removing the Raney nickel hydrogenation catalyst from the hydrogenated material and then subjecting the hydrogenated material for five minutes to hydrogen gas at a pressure of 1000 to 10,000 pounds per square inch gauge in the presence of a copper chromite hydrogenation catalyst and at a temperature of 50° C. to 250° C.

11. Process for the production of a monocyclic aminoaryl lower alkyl carbinol, which comprises reacting 1 mol of a mono-cyclic mono-nitroaryl lower alkyl ketone with about 3 mols of hydrogen gas under pressure in the presence of a metal hydrogenation catalyst the metal of which is in group VIII of the periodic table and a solvent for the ketone and at a temperature of 20° C. to 50° C., removing the metal hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

12. Process for the production of a monocyclic aminoaryl lower alkyl carbinol, which comprises reacting 1 mol of a monocyclic mono-nitroaryl lower alkyl ketone with about 3 mols of hydrogen gas under pressure in the presence of Raney nickel hydrogenation catalyst and a solvent for the ketone and at a temperature of 20° C. to 50° C., removing Raney nickel hydrogenation catalyst from the hydrogenated material and then subjecting the hydrogenated material to hydrogen gas at a pressure of 1000 to 10,000 pounds per square inch gauge in the presence of a copper chromite hydrogenation catalyst and at a temperature of 50° C. to 250° C.

No references cited.